(12) United States Patent
Choi et al.

(10) Patent No.: US 6,935,764 B2
(45) Date of Patent: Aug. 30, 2005

(54) ILLUMINATION APPARATUS FOR PLANAR DISPLAY DEVICE

(75) Inventors: Jin-seung Choi, Suwon (KR); Hwan-young Choi, Anyang (KR); Jee-hong Min, Yongin (KR); Su-mi Lee, Suwon (KR); Jin-hwan Kim, Suwon (KR); Moon-gyu Lee, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 26 days.

(21) Appl. No.: 10/259,842

(22) Filed: Sep. 30, 2002

(65) Prior Publication Data

US 2003/0235047 A1 Dec. 25, 2003

(30) Foreign Application Priority Data

Jun. 20, 2002 (KR) ........................................ 2002-34651

(51) Int. Cl.[7] .............................................. F21V 5/00
(52) U.S. Cl. .......................... 362/326; 362/31; 362/555
(58) Field of Search .............................. 362/31, 26, 27, 362/555, 330, 331, 326; 359/15

(56) References Cited

U.S. PATENT DOCUMENTS

| | | | | |
|---|---|---|---|---|
| 5,775,792 A | * | 7/1998 | Wiese | 362/328 |
| 6,196,691 B1 | * | 3/2001 | Ochiai | 362/31 |
| 6,474,826 B1 | * | 11/2002 | Tanaka et al. | 362/31 |
| 6,547,423 B2 | * | 4/2003 | Marshall et al. | 362/333 |
| 6,700,634 B2 | * | 3/2004 | Taniguchi et al. | 349/65 |
| 2003/0007359 A1 | * | 1/2003 | Sugawara et al. | 362/326 |

FOREIGN PATENT DOCUMENTS

| JP | 2001-0057327 | 7/2001 |
|---|---|---|
| JP | 2002-25325 | 1/2002 |

OTHER PUBLICATIONS

Korean Patent Office Action dated Jun. 29, 2004.

* cited by examiner

Primary Examiner—Ali Alavi
(74) Attorney, Agent, or Firm—Sughrue Mion, PLLC

(57) ABSTRACT

An illumination apparatus for planar display devices, including an optical element for making light travel parallel to an optical axis, is provided. The illumination apparatus includes a dot light source for radiating light, and a light guide plate having the optical element. The optical element is composed of a first refraction facet, which is adjacent to the dot light source and increases the emission angle of the light, and a second refraction facet, which is isolated a predetermined distance from the first refraction facet while facing the first refraction facet and reduces the emission angle of the light. In this structure, the light travels parallel to the optical axis. In the illumination apparatus, the emission angle of incident light is reduced, preferably, the light travels parallel to the optical axis. Therefore, areas not reached by light, between adjacent dot light sources, are eliminated, and light is uniformly incident upon a hologram so that the luminance and intensity of light emitted from the light guide plate are uniformly distributed.

20 Claims, 7 Drawing Sheets

FIG. 12

ILLUMINATION APPARATUS FOR PLANAR DISPLAY DEVICE

BACKGROUND OF THE INVENTION

1. Field of the Invention

The present invention relates to the field of illumination apparatuses for planar display devices, and more particularly, to an illumination apparatus for planar display devices, the illumination apparatus making incident light travel parallel to an optical axis by reducing the emission angle of the incident light.

2. Description of the Related Art

Generally, a planar display device, such as a liquid crystal display, requires an illumination apparatus to uniformly illuminate liquid crystal.

Figure 1:
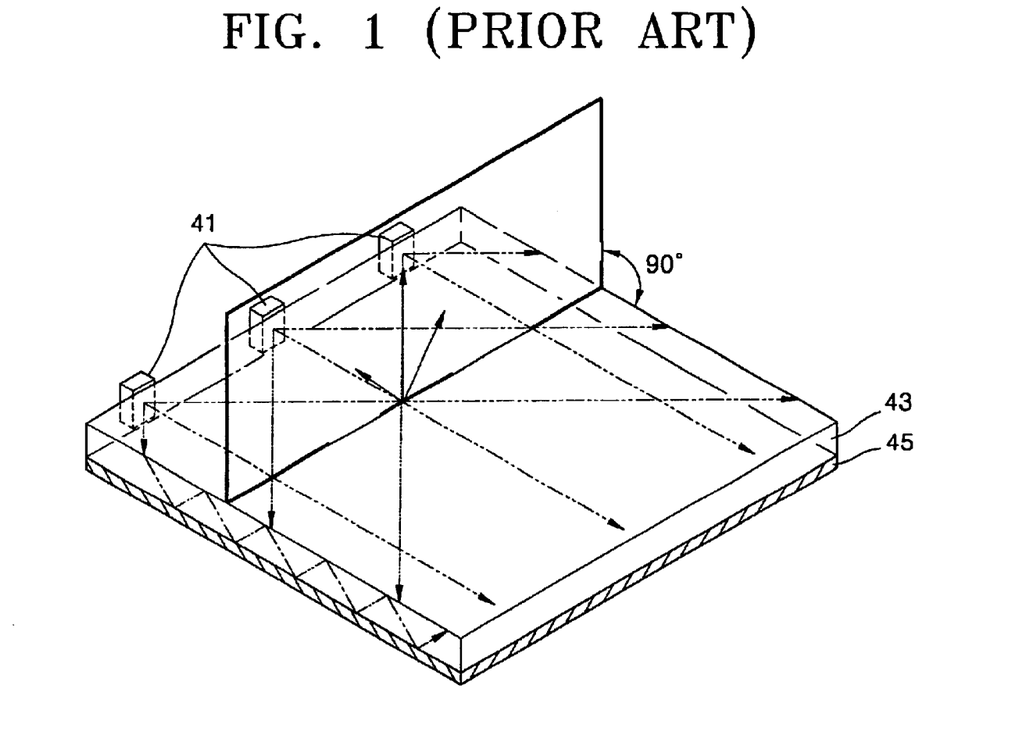
FIG. 1 is a perspective view of an illumination apparatus for planar display devices, using a conventional hologram light guide plate.

FIG. 1 is a perspective view of a conventional illumination apparatus for planar display devices, the illumination apparatus including a light guide plate using a hologram The illumination apparatus of FIG. 1 uses dot light sources, such as laser emitting diodes (LEDs) 41.

Referring to FIG. 1, the plurality of LEDs 41 are aligned on one side of a light guide plate 43, and light emitted from the LEDs 41 is diffused at a predetermined angle and travel within the light guide plate 43. Since the light radiation angle of an LED 41 is typically about 45 degree, a dead space on which light is not incident is generated around the LEDs 41, and an overlapping area on which light beams radiated from adjacent LEDs 41 overlap each other and light intensity is increased is generated at a place distanced from the LEDs 41

If a hologram pattern 45 having a uniform directivity is formed on the light guide plate 43, light must be uniformly incident upon the hologram pattern 45, so that light is emitted with high luminous efficiency from the light guide plate 43 However, in the conventional light guide plate using dot light sources, such as the LEDs 41, light emitted from each of the dot light sources is diffused, such that the luminance distribution and intensity distribution depending on the angle of a light beam emitted from the light guide plate 43 are non-uniform.

Figure 2:
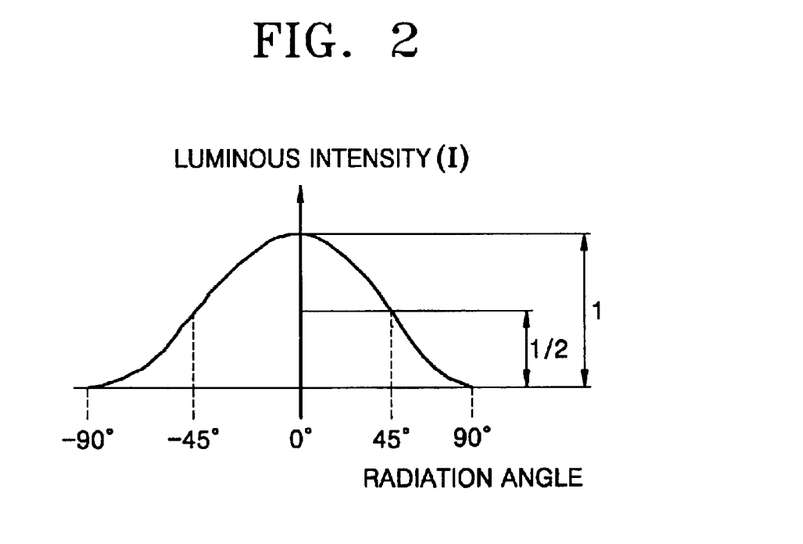
FIG. 2 is a graph showing a luminous intensity according to the radiation angle of light emitted from a dot light source.

FIG. 2 is a graph showing the luminous intensity according to the radiation angle of an LED As shown in FIG. 2, if the maximum of the luminous intensity at the center of an LED is 1, the luminous intensity decreases as the radiation angle increases. When the radiation angle is about 45 degrees, the light intensity is halved. It can be seen from FIG. 2 that the radiation angle needs to be narrowed to 45 degrees or less in order to reduce the loss of the luminous intensity.

Figure 3:
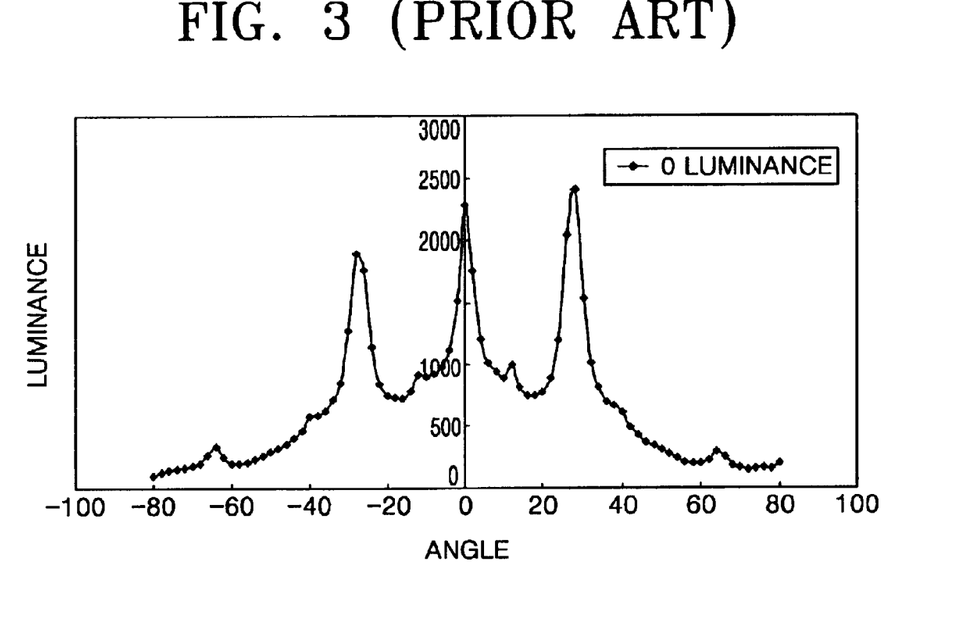
FIG. 3 is a graph showing a luminance distribution depending on the angle of light emitted from a conventional hologram light guide plate in an illumination apparatus for planar display devices.
Figure 4:
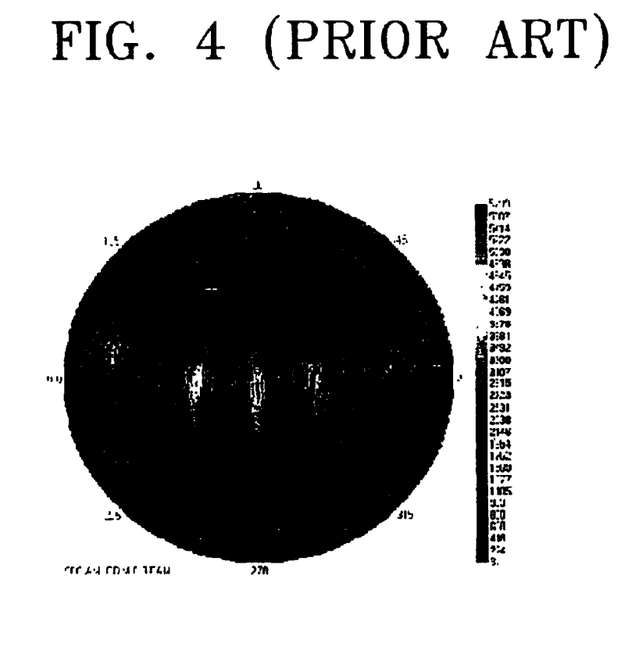
FIG. 4 is a picture showing an intensity distribution depending on the angle of light emitted from a conventional hologram light guide plate in an illumination apparatus for planar display devices.

FIG. 3 is a graph showing the distribution of luminance depending on the angle of light emitted from a light guide plate. FIG. 4 is a picture showing the distribution of intensity depending on the angle of light emitted from a conventional hologram light guide plate Referring to FIG. 3, light is not emitted in the direction perpendicular to the plane of a light guide plate, and a large quantity of light is emitted at 0 degree and ±30 degrees, where luminance is peak. Light emitted at arbitrary angles other than a right angle with respect to the plane of a light guide plate causes loss of light incident upon a liquid crystal panel, thereby degrading luminance and affecting the viewing angle of a screen.

Referring to FIG. 4, the light intensity is high at zero and ±30 degrees, where luminance is peak as shown in FIG. 3.

In an illumination apparatus for planar display devices, using a light guide plate on which a conventional hologram is formed, light is emitted from dot light sources, such that light is incident upon the hologram at a non-uniform angle. Accordingly, the emission angle of light emitted from the light guide plate is the same as that of light emitted from each of the dot light sources. Thus, the luminance distribution and intensity distribution of light are not uniform.

SUMMARY OF THE INVENTION

To solve the above-described problems, it is an object of the present invention to provide an illumination apparatus for planar display devices, in which the emission angle of light is reduced while transmitting dot light sources, such as light emitting diodes (LEDs), and the light is then incident upon a hologram at a reduced angle, so that the luminance and intensity of light emitted from a light guide plate are uniformly distributed To achieve the above object, the present invention provides an illumination apparatus for planar display devices, the illumination apparatus including a dot light source for radiating light and a light guide plate having an optical element. The optical element is composed of a first refraction facet, which is adjacent to the dot light source and increases the emission angle of the light, and a second refraction facet, which is isolated a predetermined distance from the first refraction facet while facing the first refraction facet and reduces the emission angle of the light. In this structure, the light travels parallel to an optical axis.

A hologram can be formed on at least one surface of the bottom and top surfaces of the light guide plate.

A light emitting diode (LED) or a laser diode (LD) can be used as the dot light source.

The optical element has a smaller refractive index than the refractive index of the light guide plate.

For example, the optical element is an air lens filled with air

The first and second refraction facets have the same shape as the facet of a cylindrical lens and are symmetrical to each other Alternatively, the first and second refraction facets have the same shape as the facet of a Fresnel lens and are symmetrical to each other.

Preferably, the second refraction facet has a larger curvature radius than the curvature radius of the first refraction facet In the present invention, a predetermined space or an optical element filled with a material is formed adjacent to a dot light source within a light guide plate in order to refract light entering from the dot light source at the first and second refraction facets of the optical element. Accordingly, the emission angle of the light is reduced, preferably, light travels parallel to an optical axis. The light is uniformly incident upon the bottom surface of the light guide plate, so that the luminance and intensity distributions of light emitted from the light guide plate are uniformed The above-described illumination apparatus includes an air lens for reducing the emission angle of light, thereby reducing the loss of luminous intensity. As shown in FIG. 2, luminous intensity decreases as the emission angle of light increases. Accordingly, in an illumination apparatus according to the present invention, the emission angle of light is set to be in the range of 0 to ±30 degrees, and an optical element is formed within a light guide plate so that the luminous intensity is no less than 70% of the luminous intensity at the emission angle of light of 0 degree

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 5:
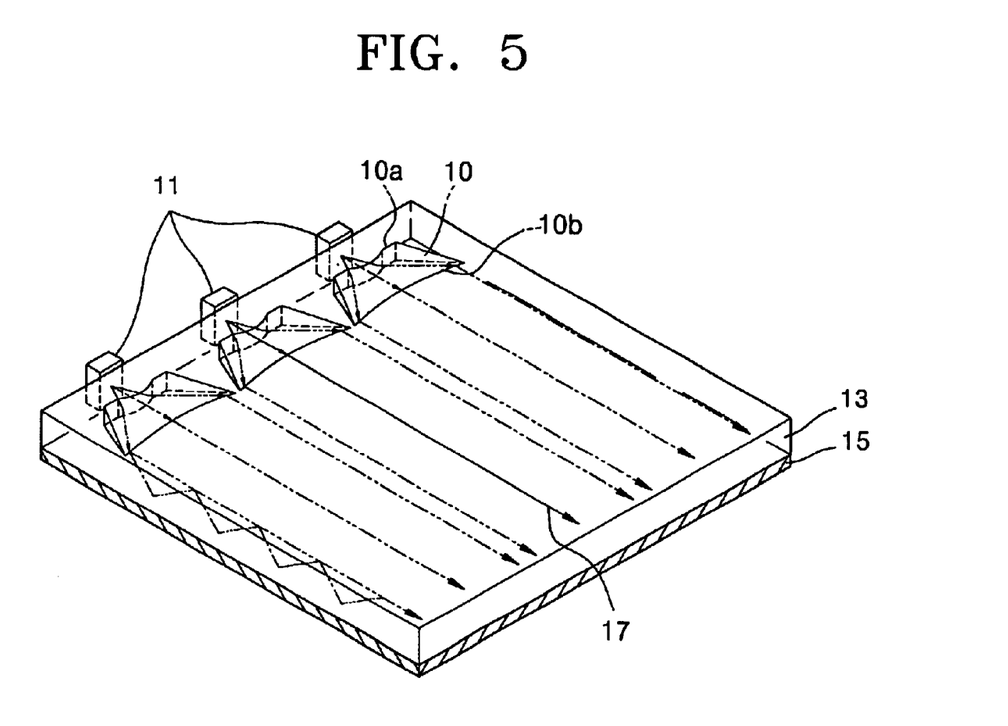
FIG. 5 is a perspective view of an illumination apparatus for planar display devices, according to a first embodiment of the present invention.

Referring to FIG. 5, in an illumination apparatus for planar display devices, according to a first embodiment of the present invention, dot light sources 11 are aligned on one side of a light guide plate 13 having a hologram 15 formed on its bottom surface. First air lenses 10 are formed adjacent to the dot light sources 11, within the light guide plate 13. The hologram 15 uniforms the luminance and luminous intensity distributions of light emitted from the light guide plate 13, and may be formed on the upper surface of the light guide plate 13. Instead of the hologram 15, an optical means for performing diffraction, such as mechanical unevenness, can also be formed on the top or bottom surface of the light guide plate 13. Or, such an optical means may not be formed on the light guide 13.

An LED or LD is used as the dot light sources 11. In order to illuminate a planar display device, such as an LCD, the plurality of dot light sources 11 are aligned adjacent to the light guide plate 13 at predetermined intervals.

The hologram 15 is formed in a pattern on the bottom surface of the light guide plate 13. As described above, the hologram 15 may be formed on the upper surface of the light guide plate 13. Either a planar or volume hologram can be used as the hologram 15. In order for the hologram 15 to receive light with a uniform intensity distribution, the pattern becomes looser as it approaches the dot light sources 11, and the pattern becomes closer as it distances from them. Alternatively, as the pattern approaches the dot light sources 11, a pattern having lower diffraction efficiency is formed. On the other hand, as the pattern distances from the dot light sources 11, a pattern having higher diffraction efficiency is formed Here, the light guide plate 13 can emit light in a uniform intensity distribution by properly controlling the size, pattern interval, and depth of the hologram 15.

In FIG. 5, the first air lenses 10 having a funnel shape that widens in the direction where light travels are formed as an optical element, within the light guide plate 13

In the illumination apparatus according to the first embodiment of the present invention, the first air lenses 10 refracts light in such a way that light travels parallel to an optical axis 17. Each of the first air lenses 10 includes a first refraction facet 10a adjacent to a light source and a second refraction facet 10b isolated a predetermined distance from the first refraction facet 10a in such a way that they face each other An optical element in a planar display device according to the present invention is formed of a material having a refractive index different from the refractive index of the light guide plate 13. For example, the optical element can be filled with air having a refractive index n=1.

Figure 6:
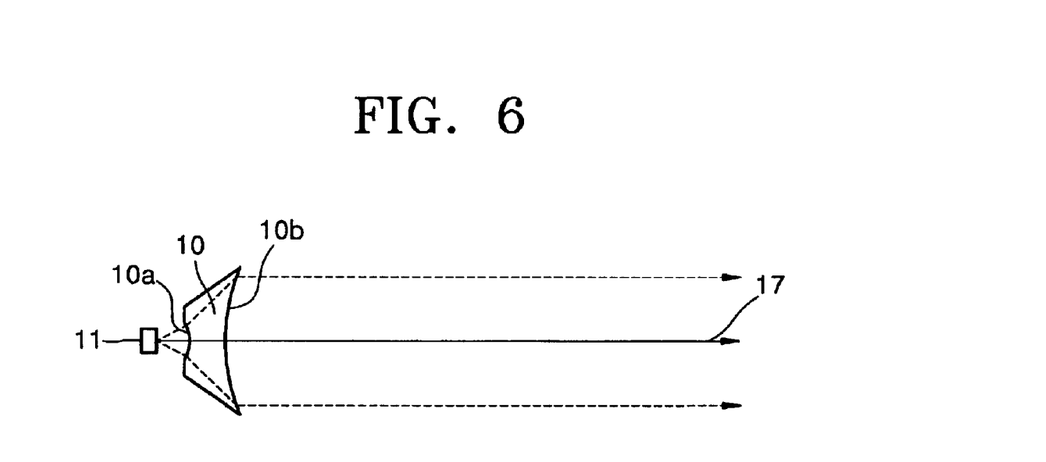
FIG. 6 is a plan view of a light path in the illumination apparatus of FIG. 5.

FIG. 6 schematically shows a light path in which light passes through a first air lens 10 within the light guide plate 13. Here, an air lens denotes an optical element formed by filling a certain space within the light guide plate 13 with a material having a smaller refractive index than the material of the light guide plate 13, such as, air.

Referring to FIG. 6, light incident upon the light guide plate 13 is refracted by the first refraction facet 10a of the first air lens 10, such that the radiation angle is increased. Then, the light is again refracted by the second refraction facet 10b, such that the radiation angle is reduced. Accordingly, the resultant light travels parallel to the optical axis 17. Here, the first air lens 10 may be filled with a material having a smaller refractive index than the material of the light guide plate 13, other than air.

Referring to FIGS. 5 and 6, preferably, light emitted from the dot light sources 11 travels parallel to the optical axis 17 while being totally reflected into the light guide plate 3. Light is incident upon the first refraction facet 10a of the first air lens 10 at a radiation angle of about 0 to ±45 degrees. The radiation angle slightly increases at the first refraction facet 10a and then decreases at the second refraction facet 10b. Accordingly, the light travels between a 0 degree and ±30 degrees, preferably, parallel to the optical axis 17 as shown in FIG. 6.

When viewed from the above down to the light guide plate 13, the light transmitted by the first air lenses 10 travels parallel to the optical axis 17. However, when viewed from the side of the light guide plate 13, the light transmitted by the first air lenses 10 travels while being totally reflected by the light guide plate 13. Some of light is diffracted by the hologram 15 formed on the bottom surface of the light guide plate 13, reflected by a reflective plate (not shown) under the bottom surface of the light guide plate 13, is again incident upon the light guide plate 13, and then discharged from the light guide plate 13 The rest of the light is emitted from the light guide plate 13 immediately after being incident upon the light guide plate 13. Alternatively, as shown in FIG. 6, while light travels parallel to the bottom surface of the light guide plate 13, it is reflected within the light guide plate 13 and then emitted from the light guide plate 13.

Figure 7A:
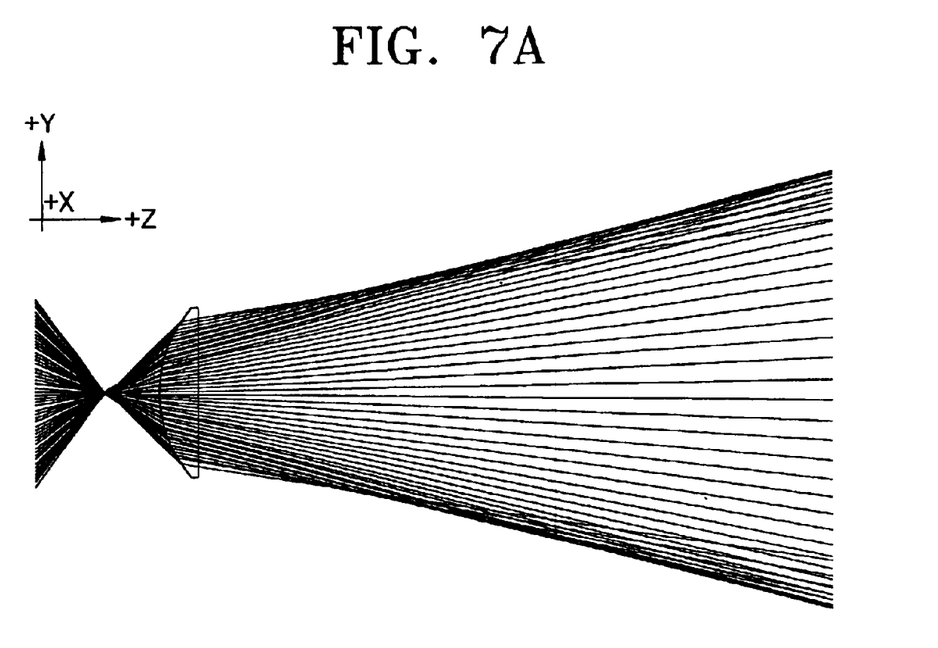
FIG. 7A is a schematic view of a light path when the radiation angle of an optical element in the illumination apparatus of FIG. 5 is adjusted to 15 degrees.

FIG. 7A is a schematic view of a light path when the radiation angle of light is set to approximately 15 degrees by adjusting the angle of the oblique side of an inclined facet of a lens extending from the vertex of the air lens 10 with respect to an optical axis to be about 30 degrees.

Figure 7B:
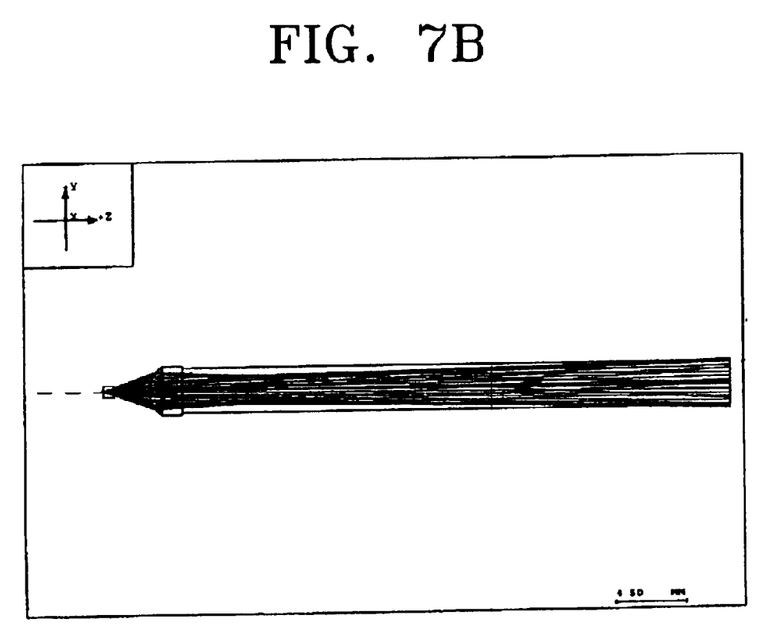
FIG. 7B is a schematic view of a light path when the radiation angle of the optical element in the illumination apparatus of FIG. 5 is adjusted to a 0 degree.

FIG. 7B is a schematic view of a light path when the radiation angle of light is set to approximately 0 degrees by adjusting the angle of the oblique side of an inclined facet of a lens extending from the vertex of the air lens 10 with respect to an optical axis to be about 0 degrees.

Figure 8:
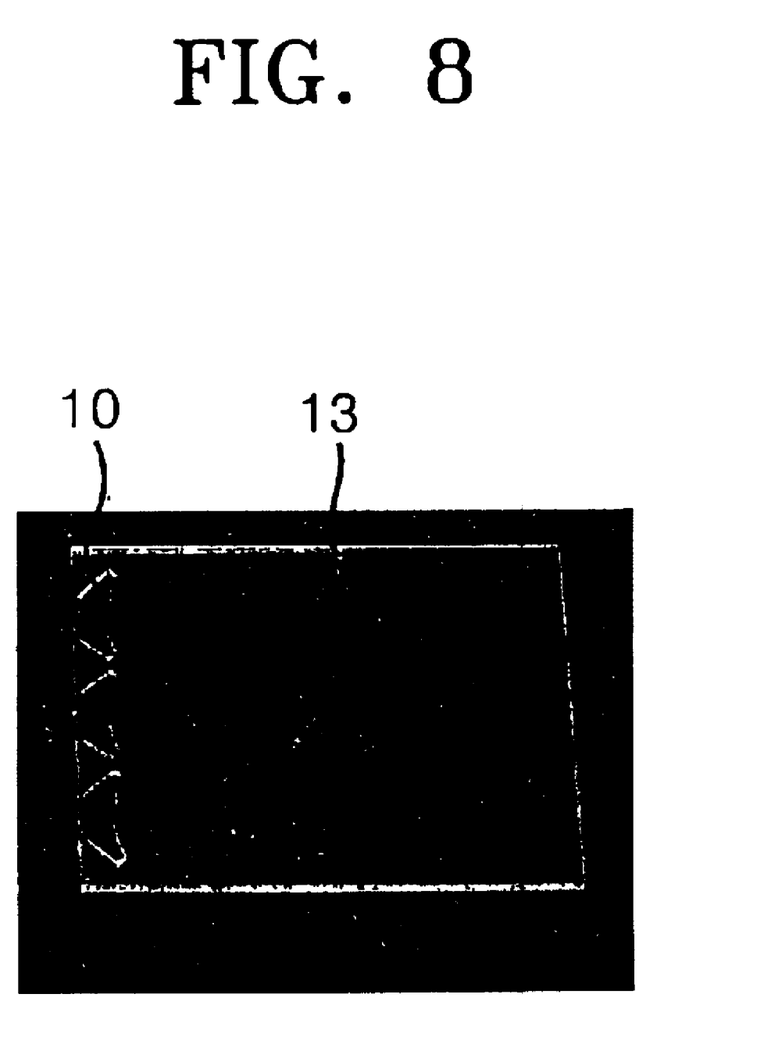
FIG. 8 is a picture showing an illumination apparatus for planar display devices, according to the first embodiment of the present invention.
Figure 9:
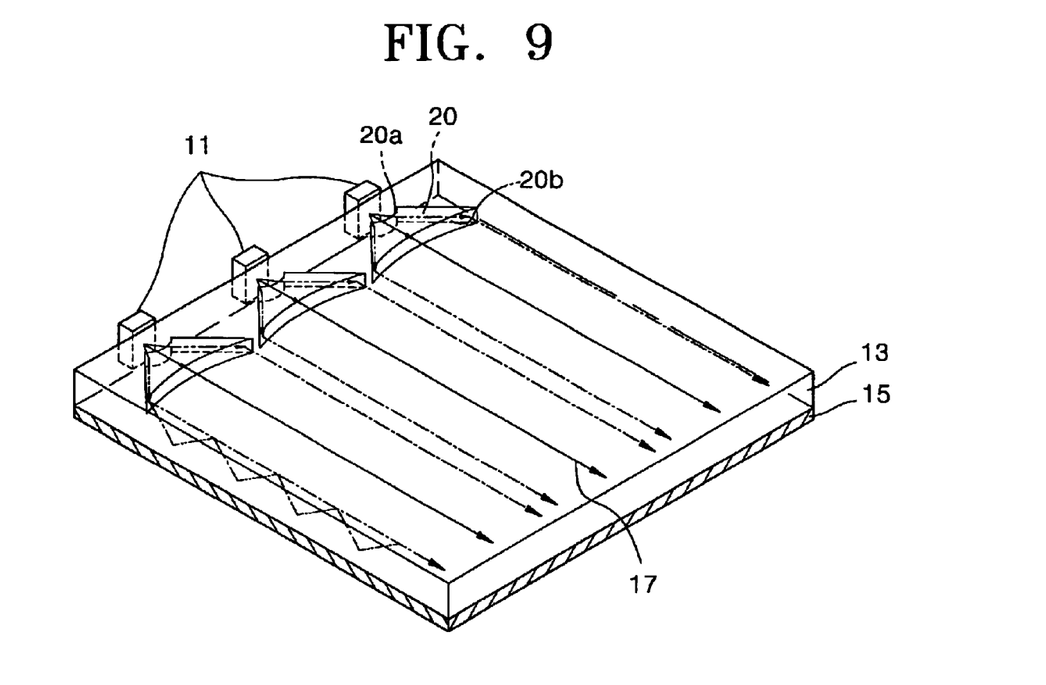
FIG. 9 is a perspective view of an illumination apparatus for planar display devices, according to a second embodiment of the present invention.

FIG. 8 is a picture showing an illumination apparatus for planar display devices, according to the first embodiment of the present invention. Referring to FIG. 8, the first air lens 10, which is filled with air, is installed adjacent to the dot light source 11, within the light guide plate 13. It can be seen that light transmitted by the first air lens 10 travels in parallel FIG. 9 is a perspective view of an illumination apparatus for planar display devices, according to a second embodiment of the present invention. Referring to FIG. 9, second air lenses 20 are installed adjacent to the dot light sources 11, within the light guide plate 13. Each of the second air lenses 20 includes first and second refraction facets 20a and 20b. The first refraction facet 20a increases the radiation angle of light emitted from the dot light sources 11 and has the same shape as the outer facet of a cylindrical lens The second refraction facet 20b has the same shape as the lens facet of a cylindrical lens and reduces the radiation angle by refracting incident light whose radiation angle has been increased by the first refraction facet 20a, so that light travels parallel to the optical axis 17. The first and second refraction facets 20a and 20b are symmetrical to each other The second refraction facet 20b has a larger curvature radius than that of the first refraction facet 20a.

A diffraction optical element, such as a hologram, is formed on the bottom or top surface of the light guide plate 13 so as to improve the diffraction efficiency of light and accordingly provide a uniform luminous intensity distribution and a uniform luminance distribution.

Light emitted from the dot light sources 11 obtains a reduced radiation angle while transmitting the second air lenses 20, preferably, travels parallel to the optical axis 17 while being totally reflected within the light guide plate 13. Thus, loss of a luminous intensity is minimized.

Figure 10:
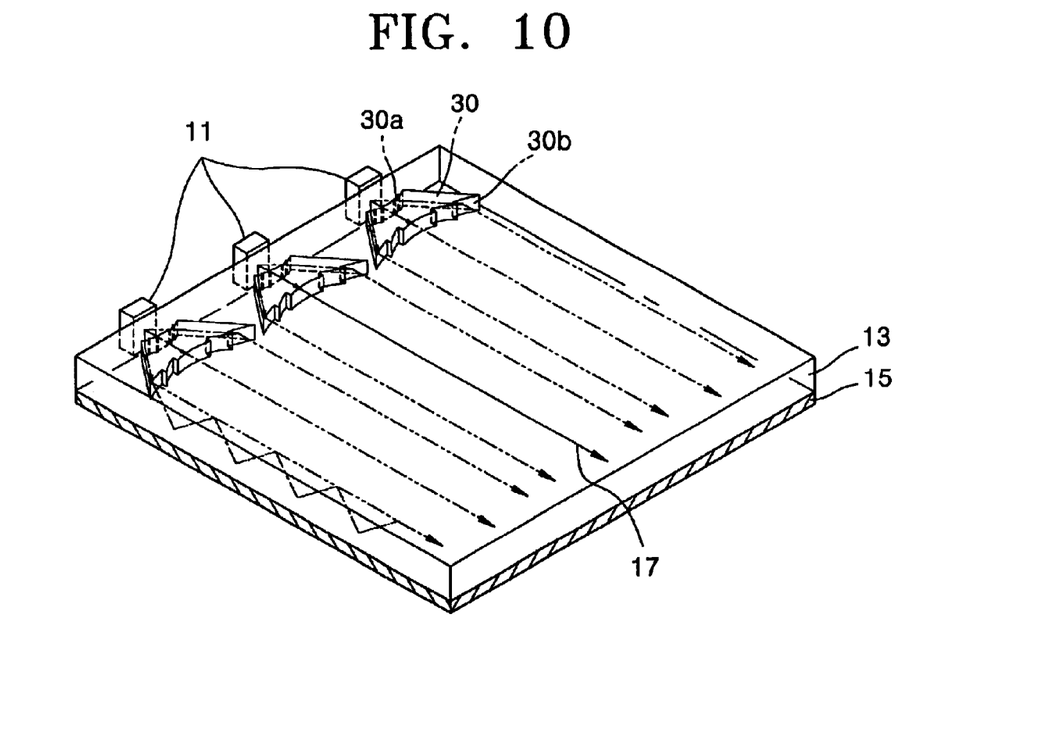
FIG. 10 is a perspective view of an illumination apparatus for planar display devices, according to a third embodiment of the present invention.

FIG. 10 is a perspective view of an illumination apparatus for planar display devices, according to a third embodiment of the present invention. Referring to FIG. 10, third air lenses 30 are installed adjacent to the dot light sources 1 within the light guide plate 13. Each of the third air lenses 30 includes first and second refraction facets 30a and 30b, which are symmetrical to each other and have the same shape as the lens facet of a Fresnel lens. The second refraction facet 30b has a larger curvature radius than that of the first refraction facet 30a. Light emitted from the dot light sources 11 are refracted while transmitting the second or third air lenses 20 or 30, such that the light travels parallel to the optical axis 17.

Like the first and second embodiments of the present invention, the illumination apparatus according to the third embodiment also has a diffraction element, such as a hologram, formed on the top or bottom surface of the light guide plate 13, so that the intensity distribution and luminance distribution of light are uniformed.

Light emitted from the dot light sources 11 obtains a reduced radiation angle while transmitting the third air lenses 30, preferably, travels parallel to the optical axis 17 while totally reflected within the light guide plate 13 Thus, loss of a luminous intensity is minimized.

All of the illumination apparatuses according to the first, second, and third embodiments of the present invention can use an optical element that can reduce the radiation angle of light or make light travel parallel to an optical axis However, the refraction index of the optical element must be different from that of the light guide plate 13.

Figure 11:
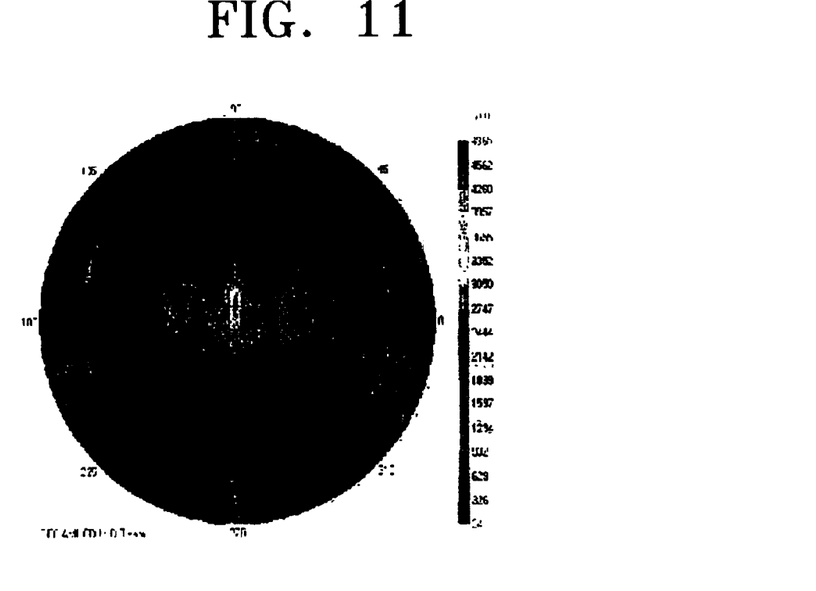
FIG. 11 is a picture showing a luminous intensity depending on the angle of light emitted from a hologram light guide plate in an illumination apparatus for planar display devices, according to an embodiment of the present invention.

FIG. 11 is a picture showing a luminous intensity distribution depending on a light emission angle shown on the upper portion of a light guide plate when air lenses for adjusting the radiation angle of light to approximately 15 degrees is formed within the light guide plate in an illumination apparatus according to the present invention Referring to FIG. 11, the luminous intensity is the strongest at the center of the light guide plate, and dim light appears at left and right areas isolated by 20 degrees The luminance at these areas is significantly lower than that at areas located at ±30 degrees in the conventional hologram light guide plate of FIG. 4.

Figure 12:
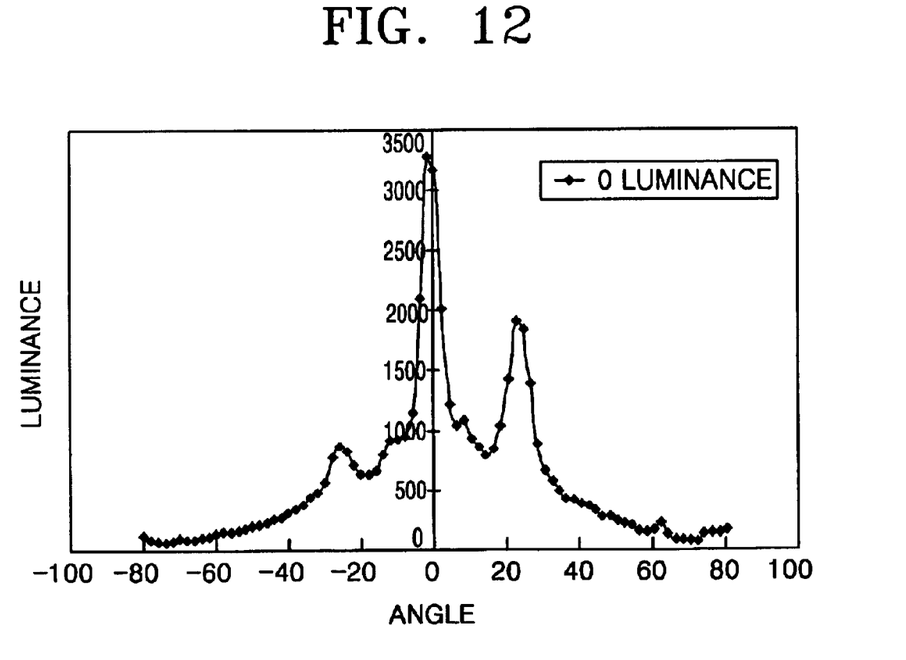
FIG. 12 is a graph showing a luminance depending on the angle of light emitted from a hologram light guide plate in an illumination apparatus for planar display devices, according to an embodiment of the present invention

FIG. 12 is a graph showing a luminance depending on a light emission angle when air lenses for adjusting the radiation angle of light to approximately 15 degrees is formed within a light guide plate in an illumination apparatus according to the present invention.

Referring to FIG. 12, the peak luminance appears at the center of the light guide plate, and a high luminance appears at left and right areas isolated by 20 degrees The luminance at these areas is significantly lower than that at areas located at ±30 degrees in the conventional hologram light guide plate of FIG. 3.

In an illumination apparatus according to the present invention, optical refraction means are installed adjacent to dot light sources within a light guide plate in order to change a light path, preferably, to make light travel in parallel to the bottom surface of the light guide plate. Therefore, dead areas not reached by light, between adjacent light guide plates, are eliminated, and light is uniformly incident upon a hologram.

While the present invention has been particularly shown and described with reference to preferred embodiments thereof, it will be understood by those of ordinary skill in the art that various changes in form and details may be made therein without departing from the spirit and scope of the present invention as defined by the appended claims As described above, an illumination apparatus according to the present invention has an optical refraction means formed adjacent to a dot light source within a light guide plate in order to reduce the emission angle of light and change a light path, preferably, to make light travel in parallel to the bottom surface of the light guide plate. Therefore, the luminance and intensity of light emitted from the light guide plate after being diffracted by a hologram are uniformly distributed according to the emission angle of light.

What is claimed is:

1. An illumination apparatus for planar display devices, the illumination apparatus comprising:

a dot light source for radiating light; and a light guide plate having an optical element, the optical element being composed of a first refraction facet, which is adjacent to the dot light source and increases the emission angle of the light, and a second refraction facet, which is isolated a predetermined distance from the first refraction facet while facing the first refraction facet and reduces the emission angle of the light, so that the light travels parallel to an optical axis, wherein the optical element has a smaller refractive index than the refractive index of the light guide plate.

2. The illumination apparatus of claim 1, wherein a hologram is formed on at least one surface of the bottom and top surfaces of the light guide plate.

3. The illumination apparatus of claim 1, wherein the dot light source is one of a light emitting diode (LED) and a laser diode (LD).

4. The illumination apparatus of claim 2, wherein the dot light source is one of a light emitting diode (LED) and a laser diode (LD).

5. The illumination apparatus of claim 1, wherein the optical element is an air lens filled with air.

6. The illumination apparatus of claim 1, wherein the first and second refraction facets have the same shape as the facet of a cylindrical lens and are symmetrical to each other.

7. The illumination apparatus of claim 2, wherein the first and second refraction facets have the same shape as the facet of a cylindrical lens and are symmetrical to each other.

8. The illumination apparatus of claim 5, wherein the first and second refraction facets have the same shape as the facet of a cylindrical lens and are symmetrical to each other.

9. The illumination apparatus of claim 1, wherein the first and second refraction facets have the same shape as the facet of a Fresnel lens and are symmetrical to each other.

10. The illumination apparatus of claim 2, wherein the first and second refraction facets have the same shape as the facet of a Fresnel lens and are symmetrical to each other.

11. The illumination apparatus of claim 5, wherein the first and second refraction facets have the same shape as the facet of a Fresnel lens and are symmetrical to each other.

12. The illumination apparatus of claim 1, wherein the second refraction facet has a larger curvature radius than the curvature radius of the first refraction facet.

13. The illumination apparatus of claim 2, wherein the second refraction facet has a larger curvature radius than the curvature radius of the first refraction facet.

14. The illumination apparatus of claim 5, wherein the second refraction facet has a larger curvature radius than the curvature radius of the first refraction facet.

15. The illumination apparatus of claim 6, wherein the second refraction facet has a larger curvature radius than the curvature radius of the first refraction facet.

16. The illumination apparatus of claim 7, wherein the second refraction facet has a larger curvature radius than the curvature radius of the first refraction facet.

17. The illumination apparatus of claim 8, wherein the second refraction facet has a larger curvature radius than the curvature radius of the first refraction facet.

18. The illumination apparatus of claim 9, wherein the second refraction facet has a larger curvature radius than the curvature radius of the first refraction facet.

19. The illumination apparatus of claim 10, wherein the second refraction facet has a larger curvature radius than the curvature radius of the first refraction facet.

20. The illumination apparatus of claim 11, wherein the second refraction facet has a larger curvature radius than the curvature radius of the first refraction facet.

* * * * *